Patented Jan. 25, 1944

2,339,885

UNITED STATES PATENT OFFICE 2,339,885

DIALYZING DIAPHRAGM

Walter Schmid, Wolfen, Kreis Bitterfeld, and Karl Hermann Schuh, Bitterfeld, Germany; vested in the Alien Property Custodian No Drawing. Application May 29, 1941, Serial No. 395,894. In Germany May 4, 1940

5 Claims. (Cl. 210—8.5)

Our present invention relates to dialyzing diaphragms and more particularly to diaphragms produced from polymerized substances.

It is known to use cotton fabric impregnated with inorganic substances, if desired, for dialyzing caustic soda solutions or other alkaline liquids injuring the resistance of the cellulose fibers.

There are large dialyzing surfaces in the dialyzing apparatus of the Cerini, Heibig and van Barnefeld systems which are employed to a large extent. Since cellulose diaphragms are rapidly attacked by strong alkaline solutions so that they soon are unable to withstand even slight mechanical vibrations and other similar influences it is necessary very often to renew the diaphragms. It is also of disadvantage that the replacement of the diaphragms causes a considerable loss of time especially as they must be changed by hand.

It is an object of the present invention to obviate the disadvantages mentioned above.

Another object is the provision of improved dialyzing diaphragms prepared from fabric or the like of polymeric hydrocarbons.

A further object is to provide improved diaphragms made of polymerized vinylchloride.

Other objects of our invention will be apparent from the following description.

The present invention is based on the observation that a fabric, felt or paper from filaments or fibers produced from polymeric hydrocarbons or the derivatives thereof containing chlorine or from mixed polymerization products containing such polymeric components as hitherto proposed for filtration is also suited to be worked up into appropriate dialyzing diaphragms for alkaline liquids when, after swelling if desired, the fabric or the like is impregnated with metal compounds capable of producing thereon a semipermeable layer insoluble in aqueous alkaline liquids.

All inorganic compounds which are usually employed in the production of dialyzing diaphragms for alkaline liquids, for instance, metal compounds forming hydroxides insoluble in aqueous alkaline liquids such as salts of alkaline-earth metals (see German Patent No. 571,702) may be used for the purposes of the present invention. It is quite surprising that in spite of the low capacity of swelling in aqueous liquids of the filaments prepared from these highly polymerized substances the coat consisting of the semipermeable layer so strongly adheres that the technical application of the diaphragm is possible. The inorganic salts are especially intensely absorbed if the fabric or the like is presoaked with an organic liquid capable of dissolving it and subsequently treated with the metal salt solution. The capacity of the organic liquids to soak the fabric or the like may be easily adjusted to the desired degree. To the organic liquids able to dissolve the polymerization products there are added non-solvents in such an amount that the fabric only swells and the mixture of the liquids is not capable of dissolving it wholly or partly. As solvents, liquids or mixtures thereof miscible with water are conveniently used and water is preferred to serve as the non-solvent. The mixing proportion of solvents and non-solvents varies with the thickness and the strength of the fabric. The period of action necessary for sufficiently swelling is 30 minutes to 1 hour in general. Liquids having a low capacity of soaking, however, may also act on the fabric for an essentially longer time, for instance 24 hours and more, without effecting a detrimental transformation thereof. Furthermore, the shrinking is dependent on the temperature so that, for instance it is possible to employ a mixture having a relatively low percentage of solvents at a high swelling temperature. Instead of the mixture of a solvent and a non-solvent there may also be used a single liquid substance capable of soaking the fabric without dissolving, as for instance, benzine or benzene.

Since an addition of salts to the swelling liquids increases the effect of swelling, it is often advantageous to dissolve the inorganic salts necessary for forming the semipermeable layer in the swelling liquid and cause this solution to act upon the fabric. The impregnation with the inorganic salt solution, however, may also be carried out subsequently to the swelling treatment. Especially suitable soaking liquids are, for instance, aqueous solutions of acetone, tetrahydrofuran, glycolformal or methylglycolformal.

The semipermeable coats may, for instance, be produced in the following way:

A fabric prepared from polymerized vinylchloride and consisting of 16 warp filaments, denier 1180, and 12 weft filaments, denier 1186, per cm.$^2$ is treated with an aqueous acetone solution of 30% strength, containing 15% of magnesium chloride (or 15% of calcium chloride or barium chloride) at 20° C. for 1 hour. The fabric is subsequently freed from the liquid by slightly pressing and dried. Finally the fabric is treated with an aqueous caustic soda solution of 17% strength. After the sodium chloride thus formed has been removed from the fabric by washing with water the desired dialyzing diaphragm is ready for use.

A dialyzing diaphragm thus produced has the same dialyzing effect as the cotton fabrics used heretofore but it is nearly unlimitedly durable even if the diaphragm is dried after each employment. Accordingly, the process of the invention also has important economical advantages.

The step of soaking the fabric or the like with liquids may also be replaced by a heating treatment which results in shrinking but the semipermeable layer produced on a shrunken material less strongly adheres thereto than to a material swollen by a liquid. Moreover, the permeability of polymer diaphragms having a large surface cannot be adjusted by heat shrinking in such a convenient manner as is possible by soaking with liquids.

Since many apparently widely different embodiments of this invention may be made without departing from the spirit and scope thereof, it is to be understood that we do not limit ourselves to the specific embodiments thereof except as defined in the appended claims.

We claim:

1. A dialyzing diaphragm comprising a polymerized vinyl compound carrying a semi-permeable coating of an alkaline earth metal compound insoluble in aqueous alkaline liquids.

2. A dialyzing diaphragm comprising polyvinyl chloride carrying a semi-permeable coating of an alkaline earth metal compound insoluble in aqueous alkaline liquids.

3. The article as defined in claim 2, wherein the alkaline earth metal is magnesium.

4. The article as defined in claim 2, wherein the alkaline earth metal is calcium.

5. The article as defined in claim 2, wherein the alkaline earth metal is barium.

WALTER SCHMID.
KARL HERMANN SCHUH.